United States Patent
Zhang (10) Patent No.: US 11,086,372 B2
(45) Date of Patent: Aug. 10, 2021

(54) PROCESSING METHOD AND TERMINAL DEVICE

(71) Applicant: Lenovo (Beijing) Co., Ltd., Beijing (CN)

(72) Inventor: Hong Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 268 days.

(21) Appl. No.: 15/941,942

(22) Filed: Mar. 30, 2018

(65) Prior Publication Data

US 2019/0094930 A1      Mar. 28, 2019

(30) Foreign Application Priority Data

Sep. 28, 2017   (CN) .......................... 201710894382.0

(51) Int. Cl.
  *G06F 1/24*     (2006.01)
  *G06F 21/44*    (2013.01)
  *G06F 21/51*    (2013.01)

(52) U.S. Cl.
  CPC .............. *G06F 1/24* (2013.01); *G06F 21/44* (2013.01); *G06F 21/51* (2013.01)

(58) Field of Classification Search
  CPC . G06F 1/24; G06F 21/44; G06F 21/51; G06F 21/445; G06F 21/35;

(Continued)

(56) References Cited

U.S. PATENT DOCUMENTS 6,148,192 A * 11/2000 Ahvenainen .......... H04W 12/06
                                                     455/410
7,461,264 B2 * 12/2008 Chen ....................... G06F 21/35
                                                     235/380

(Continued)

FOREIGN PATENT DOCUMENTS

CN   103875211 A   6/2014
CN   104992088 A   10/2015
CN   105656649 A   6/2016

OTHER PUBLICATIONS

Stephen Seifer, "Mobile phone transformation-modify the IMEI code of the mobile phone (for contract machine unbinding)", Baidu Experience, Jun. 21, 2015, retrieved from the Internet:URL: https://jingyan.baidu.com/article/851fbc37c261233e1f15abdc.html, [retrieved on Jan. 7, 2020], pp. 1-4 9 Pages (including translation).

*Primary Examiner* — Jaweed A Abbaszadeh
*Assistant Examiner* — Brian J Corcoran
(74) *Attorney, Agent, or Firm* — Anova Law Group, PLLC (57) ABSTRACT

A processing method and a terminal device are provided. The processing method comprises, provided that a storage device stores an association relationship between a first communication identifier and a first device identifier corresponding to a terminal device, and the terminal device is not connected to the storage device, monitoring whether a predetermined condition is satisfied. The processing method further comprises, in response to monitoring that the predetermined condition is satisfied, performing a corresponding process. After the terminal device and the storage device are connected, the storage device stores an association relationship between a second communication identifier and a device identifier corresponding to the terminal device.

16 Claims, 2 Drawing Sheets

(58) Field of Classification Search
CPC .... H04L 61/6054; H04W 60/00; H04W 8/18; H04W 8/005; H04W 8/22; H04W 8/24; H04W 8/183; H04W 8/20; H04W 8/205
See application file for complete search history.

(56) References Cited

U.S. PATENT DOCUMENTS

| | | | | |
|---|---|---|---|---|
| 2005/0153741 | A1* | 7/2005 | Chen | H04W 8/205 455/558 |
| 2005/0197102 | A1* | 9/2005 | Kim | H04W 8/183 455/410 |
| 2006/0009214 | A1* | 1/2006 | Cardina | H04W 8/22 455/432.3 |
| 2007/0004455 | A1* | 1/2007 | Wennberg | H04W 8/18 455/558 |
| 2007/0076760 | A1* | 4/2007 | Wennberg | H04W 8/205 370/477 |
| 2012/0289205 | A1* | 11/2012 | Burgess | H04L 63/0407 455/414.1 |
| 2012/0309353 | A1* | 12/2012 | Markov | H04W 12/06 455/411 |
| 2013/0165117 | A1* | 6/2013 | Narayanan | H04W 60/04 455/435.1 |
| 2015/0026330 | A1* | 1/2015 | Ahmed | G06F 21/73 709/224 |
| 2017/0168533 | A1* | 6/2017 | Rhoads | G06F 1/24 |
| 2017/0337390 | A1* | 11/2017 | Hamilton | H04L 9/0877 |

* cited by examiner

```
┌─────────────────────────────────────────────────────────┐
│   Provided that a storage device stores an association  │
│  relationship between a first communication identifier and a │  101
│  first device identifier corresponding to a terminal device, and │
│    the terminal device is not connected to the storage device, │
│    monitoring whether a predetermined condition is satisfied │
└─────────────────────────────────────────────────────────┘
                            │
                            ▼
┌─────────────────────────────────────────────────────────┐
│ After monitoring that the predetermined condition is satisfied, │  102
│ performing a corresponding process, wherein after the terminal │
│ device and the storage device are connected, the storage device │
│    stores an association relationship between a second   │
│ communication identifier and a device identifier corresponding │
│                   to the terminal device                │
└─────────────────────────────────────────────────────────┘
```

PROCESSING METHOD AND TERMINAL DEVICE

CROSS-REFERENCES TO RELATED APPLICATIONS

This application claims the priority of Chinese patent application No. 201710894382.0, filed on Sep. 28, 2017, the entire content of which is incorporated herein by reference.

FIELD OF THE DISCLOSURE

The present disclosure generally relates to the field of information processing technology and, more particularly, relates to a processing method and a terminal device thereof.

BACKGROUND

During the operation of a terminal device, there is a scenario of setting an account corresponding to the terminal device. That is, the user is allowed to control and use the terminal device after the terminal device is linked to the account. In this case, if the user transfers the terminal device to other users, the account has to be unlinked, thereby allowing other users to relink a new account to the terminal device. The new account can be relinked by the original user, or the new user resets the device after being connected to a network and then releases the linking relationship of the original account.

However, existing methods for relinking an account may include substantially complicated operations, and the operations may have to be performed after the terminal device is connected to the network. That is, the existing methods for relinking an account may not provide the user convenience operations, thereby degrading the user efficiency and the user experience.

The disclosed processing method and terminal device thereof are directed to solve one or more problems set forth above and other problems.

BRIEF SUMMARY OF THE DISCLOSURE

One aspect of the present disclosure provides a processing method. The processing method comprises: provided that a storage device stores an association relationship between a first communication identifier and a first device identifier corresponding to a terminal device, and the terminal device is not connected to the storage device, monitoring, by the terminal device, whether a predetermined condition is satisfied. The processing method further comprises: in response to monitoring that the predetermined condition is satisfied, performing a corresponding process. After the terminal device and the storage device are connected, the storage device stores an association relationship between a second communication identifier and a device identifier corresponding to the terminal device.

Another aspect of the present disclosure provides a terminal device. The terminal device comprises: a monitor, wherein, provided that a storage device stores an association relationship between a first communication identifier and a first device identifier corresponding to a terminal device, and the terminal device is not connected to the storage device, the monitor monitors whether a predetermined condition is satisfied; and a processor, wherein after the monitor monitors that the predetermined condition is satisfied, the processor performs a corresponding process. After the terminal device and the storage device are connected, the storage device stores an association relationship between a second communication identifier and a device identifier corresponding to the terminal device.

Another aspect of the present disclosure provides a terminal device. The terminal device comprises: a processor and a memory wherein the memory stores a computer program that is capable of running on the processor. When executing the computer program, the processor executes a processing method. The processing method comprises: provided that a storage device stores an association relationship between a first communication identifier and a first device identifier corresponding to a terminal device, and the terminal device is not connected to the storage device, monitoring, by the terminal device, whether a predetermined condition is satisfied. The processing method further comprises: in response to monitoring that the predetermined condition is satisfied, performing a corresponding process. After the terminal device and the storage device are connected, the storage device stores an association relationship between a second communication identifier and a device identifier corresponding to the terminal device.

Other aspects of the present disclosure may be understood by those skilled in the art in light of the description, the claims, and the drawings of the present disclosure.

BRIEF DESCRIPTION OF THE DRAWINGS

To more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. It should be noted that the relative arrangement of the components and steps, the numerical expressions, and numerical values set forth in the exemplary embodiments do not limit the scope of the present disclosure unless it is specifically stated otherwise.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
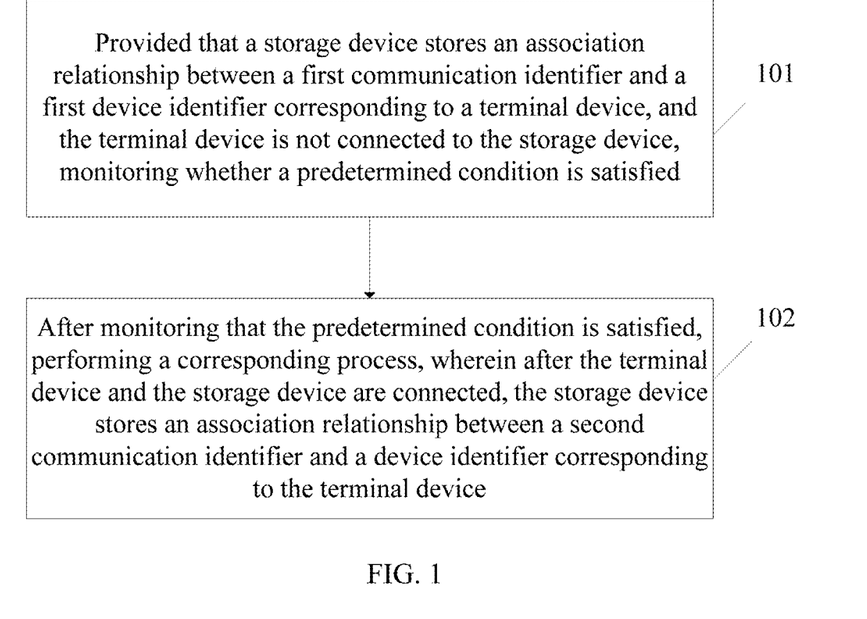
FIG. 1 illustrates a flow chart of an exemplary processing method consistent with disclosed embodiments.

The present disclosure provides a processing method. FIG. 1 illustrates a flow chart of an exemplary processing method consistent with disclosed embodiments. As shown in FIG. 1, the processing method may comprise:

Step 101: provided that a storage device stores an association relationship between a first communication identifier and a first device identifier corresponding to a terminal device, and the terminal device is not connected to the storage device, monitoring, by the terminal device, whether a predetermined condition is satisfied; and Step 102: in response to monitoring that the predetermined condition is satisfied, performing a corresponding process, such that after the terminal device and the storage device are connected, the storage device stores an association relationship between a second communication identifier and a device identifier corresponding to the terminal device.

In the disclosed embodiments, the terminal device may include, for example, a smart phone, a tablet, a laptop, a smart speaker or a smart robot, and the storage device may include, for example, a storage-enabled server on the network.

The first communication identifier may be a user account for the user to operate the terminal device.

In Step 101, monitoring, by the terminal device, whether the predetermined condition is satisfied may further include: detecting whether the terminal device obtains an operation of clearing configuration information, wherein clearing the configuration information refers to deleting the data which is stored in the terminal device or the storage device and related to the configuration information of the terminal device.

The operation of clearing the configuration information may include a reset operation. Further, the configuration information to be cleared (i.e., the data related to configuration information to be cleared) may include information stored in the terminal device, or information stored in the storage device.

In Step 102, performing the corresponding process may further include: changing the first device identifier of the terminal device to a second device identifier, such that the storage device may be able to store the association relationship between the second communication identifier and the second device identifier. In particular, the terminal device may respectively have a device identifier that uniquely represents the terminal device at different time periods. That is, the first device identifier of the terminal device may be different from the second device identifier of the terminal device.

The first device identifier may be obtained by processing a unique identifier of the terminal device and a first value, in which the unique identifier may include a device code of the terminal device, such as an IMSI, an IMEI, etc.

The first device identifier may be generated by various approaches. Certain exemplary generating approaches of the first device identifier are explained below, which is for illustrative purposes and is not intended to limit the scope of the present disclosure.

In one embodiment, the first device identifier may be generated by directly adding the first value after the unique identifier.

In another embodiment, the first device identifier may be generated by adding the first value before the unique identifier.

In another embodiment, the first device identifier may be generated by calculating the first value and the unique identifier, and the calculated result may be obtained as the first device identifier. Calculating the first value and the unique identifier may include simple addition, subtraction, multiplication or division, or may mix various calculation modes. Further, calculating the first value and the unique identifier may include exponential calculation, logarithm calculation, etc., which is not limited by the present disclosure.

Changing the first device identifier of the terminal device to the second device identifier may further include: processing the device identifier which uniquely represents the terminal device and the second value, to obtain the second device identifier which uniquely represents the terminal device. The second device identifier may be different from the first device identifier.

The approaches for processing the device identifier and the second value which uniquely represents the terminal device may be similar to the foregoing processing methods of the first device identifier, and details are not repeated here.

In particular, the first value may be different from the second value. Various conversion strategies for the first value and the second value may be adopted. Certain exemplary conversion strategies for the first value and the second value are explained below, which is for illustrative purposes and is not intended to limit the scope of the present disclosure.

In one embodiment, the second value may be obtained by increasing or decreasing the first value by N, where N is a positive integer. For example, the second value may be obtained by increasing the first value by 1.

In another embodiment, the second value may be obtained by multiplying the first value by M, wherein M is a positive integer other than 1. When the first value is equal to 1, the first value may be first added by N and then multiplied by M.

In another embodiment, when the numbers in the first value are greater than or equal to 2 and the numbers in the first value are at least partially different, the second value may be obtained by exchange the order of numbers in the first value. For example, the first value is 12, then the second value may be 21. When the numbers in the first value are greater than 2, for example, the first value is 789, the second value may be obtained by exchange the order of any two numbers in the first value. For example, the second value may be 879, 987 and so on.

In another embodiment, the second value may be obtained by processing the first value according to a predetermined equation. The predetermined equation may include two or more calculation modes such as addition, subtraction, multiplication, division, logarithm calculation, and so on.

Further, after the Step 102 is completed, the processing method may further include: after detecting that the terminal device establishes the connection with the storage device, sending the second device identifier to the storage device, such that the storage device relinks the second device identifier with the second communication identifier. Thus, the terminal device may be able to release a linking relationship with the first communication identifier, and establish an association relationship (i.e., a linking relationship) with the second communication identifier.

In one embodiment, the unique identifier of the terminal device (such as MAC address or serial number) plus a number (i.e., the unique identifier of the device+number) may be used to uniquely represent the terminal device. Provided that the terminal device is not connected to the network, after the user resets the terminal device, the number may be added by 1. Thus, once the user resets the terminal device, the unique identifier of the terminal device may be changed. Cloud may take the reset terminal device as a new device, such that a new user may be able to be linked to the reset terminal device.

Accordingly, at the server side, the saved record of the association relationship, which is corresponding to the linking relationship between the stored device identifier and the user account, may also be periodically detected, and whether there are two records of the association relationship for the same device may be determined.

After determining that there are two records of the association relationship for the same device, the server may automatically release (or delete) a record of the association relationship having the earliest created time, such that the server may only store one record of the association relationship for the same device. Thus, the server (or the storage device side) may not save too much invalid data, and the space usage efficiency may be ensured.

In the disclosed embodiments, provided that the storage device stores an association relationship between a first communication identifier and a first device identifier corresponding to the terminal device, and the terminal device is not connected to the storage device, a corresponding process may be performed, such that the storage device may be able to establish the association relationship between the second communication identifier and the terminal device. Thus, the problem that the association relationship between the terminal device and the communication identifier may be modified only after the connection between the terminal device and the storage device is established in the prior art may be resolved, and complicated issues that the original user needs to be unlinked in the prior art may be avoided.

The present disclosure also provides another processing method. As shown in FIG. 1, the processing method may comprise:

Step 101: provided that a storage device stores an association relationship between a first communication identifier and a first device identifier corresponding to a terminal device, and the terminal device is not connected to the storage device, monitoring, by the terminal device, whether a predetermined condition is satisfied; and Step 102: in response to monitoring that the predetermined condition is satisfied, performing a corresponding process, such that after the terminal device and the storage device are connected, the storage device stores an association relationship between a second communication identifier and a device identifier corresponding to the terminal device.

In the disclosed embodiments, the terminal device may include, for example, a smart phone, a tablet, a laptop, a smart speaker or a smart robot, and the storage device may include, for example, a storage-enabled server on the network.

The first communication identifier may be a user account for the user to operate the terminal device. In addition, the second communication identifier may be different from the first communication identifier, for example, the second communication identifier may be another user account.

In Step 101, monitoring, by the terminal device, whether the predetermined condition is satisfied may further include: detecting whether the terminal device obtains an operation of clearing configuration information, wherein clearing the configuration information refers to deleting the data which is stored in the terminal device or the storage device and related to the configuration information of the terminal device.

The operation of clearing the configuration information may include a reset operation. Further, the configuration information to be cleared (i.e., the data related to configuration information to be cleared) may include information stored in the terminal device, or information stored in the storage device. After the original user transfers the terminal device to other users, other users may perform the process of clearing the original user's configuration. The original user's configuration may include data stored in the storage device on the network. After the reset operation is detected, it may be considered that the original linking relationship may be triggered to be released, and a new linking relationship may be triggered to be established.

In Step 102, performing the a corresponding process may further include: setting a first flag in a preset data area, wherein the preset data area is an area where no change occurs when the terminal device performs the operation of clearing the configuration information; and providing a third value to the first flag, such that after the connection between the terminal device and the storage device is established, the storage device may be able to release the association relationship between the first communication identifier and the device identifier of the terminal device.

In particular, during the reset of the terminal device, multiple data areas may exist, among which contents stored in one or more data areas may not change. In the disclosed embodiments, the one or more data areas whose content does not change during the reset of the terminal device may be determined as the preset data areas.

In the preset data area, a third value or a fourth value may be provided. For example, the third value may be "True" and the fourth value may be "False", or the third value may be 1 and the fourth value may be 0, or vice versa, as long as the terminal device is able to identify whether the original linking relationship is desired to be released.

After the first flag in the present data area is set as the third value, the terminal device may be instructed, after being reset, to at least send indication information to the storage device on the network, in which the indication information is capable of releasing the association relationship between the first communication identifier and the device identifier of the terminal device.

After the first flag in the present data area is set as the fourth value, the terminal device may be instructed, after being reset, to not send the indication information. That is, the original linking relationship may not be released.

Further, after the Step 102 is completed and the terminal device and the storage device are connected and the first flag in the present data area is set as the third value, the indication information may be sent to the storage device. According to the indication information, the storage device may release the association relationship between the first communication identifier and the device identifier of the terminal device, such that the storage device may be able to associate the second communication identifier with the first device identifier.

Correspondingly, after the storage device receives the indication information, in the indication information, whether the first flag in the preset data area is set as the third value may be detected. In response to detecting that the first flag is set as the third value in the preset data area, the storage device may release the saved association relationship (linking relationship) between the first communication identifier and the device identifier of the terminal device.

Further, after the storage device releases the saved association relationship, the processing method may further include: changing, by the storage device, the first flag in the preset data area to the fourth value. That is, the third value of the first flag may be changed to be the fourth value.

In addition, after sending the indication information to the storage device on the network, the terminal device may also send the second communication identifier to the network when the new second identifier is desired to be linked, such that after receiving the second communication identifier, the storage device may link the second communication identifier to the device identifier of the terminal device.

In one embodiment, during the reset of the terminal device by the user, in response to determining that a user account is linked to the terminal device, a first flag in the data area which is not going to be reset may be set as "True". After the reset of the terminal device is completed and the terminal device is restarted, if the first flag is "True", then the first thing after the terminal device is connected to the Cloud is to release the linking relationship between the device and the account. After the releasing is completed, the first flag may be set to be "False". Thus, given a next account is going to be linked to the terminal device, the linking relationship between the device and the original account may have been released and, accordingly, the linking of the next account to the device may not be affected.

In the disclosed embodiments, provided that the storage device stores an association relationship between a first communication identifier and a first device identifier corresponding to the terminal device, and the terminal device is not connected to the storage device, a corresponding process may be performed, such that the storage device may be able to establish the association relationship between the second communication identifier and the terminal device. Thus, the problem that the association relationship between the terminal device and the communication identifier may be modified only after the connection between the terminal device and the storage device is established in the prior art may be resolved, and complicated issues that the original user needs to be unlinked in the prior art may be avoided.

Figure 2:
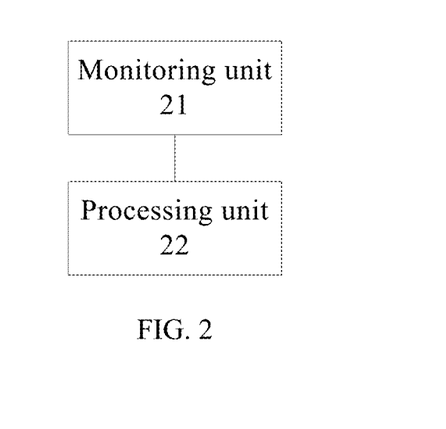
FIG. 2 illustrates a block diagram of an exemplary terminal device consistent with disclosed embodiments.

The present disclosure further provides a terminal device. FIG. 2 illustrates a block diagram of an exemplary terminal device consistent with disclosed embodiments. As shown in FIG. 2, the terminal device may comprise:

a monitor 21, wherein the monitor 21 monitors whether a predetermined condition is satisfied, provided that a storage device stores an association relationship between a first communication identifier and a first device identifier corresponding to a terminal device, and the terminal device is not connected to the storage device; and a processor 22, wherein the processor performs a corresponding process after the monitor 21 monitors that the predetermined condition is satisfied, such that after the terminal device and the storage device are connected, the storage device stores an association relationship between a second communication identifier and a device identifier corresponding to the terminal device.

In the disclosed embodiments, the terminal device may include, for example, a smart phone, a tablet, a laptop, a smart speaker or a smart robot, and the storage device may include, for example, a storage-enabled server on the network.

The first communication identifier may be a user account for the user to operate the terminal device.

When monitoring whether the predetermined condition is satisfied, the monitor 21 may detect whether the terminal device obtains an operation of clearing configuration information, wherein clearing the configuration information refers to deleting the data which is stored in the terminal device or the storage device and related to the configuration information of the terminal device.

The operation of clearing the configuration information may include a reset operation. Further, the configuration information to be cleared (i.e., the data related to configuration information to be cleared) may include information stored in the terminal device, or information stored in the storage device.

Correspondingly, when performing the corresponding process, the processor 22 may change the first device identifier of the terminal device to a second device identifier, such that the storage device may be able to store the association relationship between the second communication identifier and the second device identifier. In particular, the terminal device may respectively have a device identifier that uniquely represents the terminal device at different time periods.

The first device identifier may be obtained by processing a unique identifier of the terminal device and a first value, and the unique identifier may include a device code of the terminal device, such as an IMSI, an IMEI, etc.

The first device identifier may be generated by various approaches. Certain exemplary generating approaches of the first device identifier are explained below, which is for illustrative purposes and is not intended to limit the scope of the present disclosure.

In one embodiment, the first device identifier may be generated by directly adding the first value after the unique identifier.

In another embodiment, the first device identifier may be generated by adding the first value before the unique identifier.

In another embodiment, the first device identifier may be generated by calculating the first value and the unique identifier, and the calculated result may be obtained as the first device identifier. Calculating the first value and the unique identifier may include simple addition, subtraction, multiplication or division; or may mix various calculation modes. Further, calculating the first value and the unique identifier may include exponential calculation, logarithm calculation, etc., which is not limited by the present discourse.

The processor 22 may process the device identifier that uniquely represents the terminal device and the second value, to obtain the second device identifier which uniquely represents the terminal device. In particular, the second device identifier may be different from the first device identifier.

The approaches for processing the device identifier and the second value which uniquely represents the terminal device may be similar to the foregoing processing method of the first device identifier, and details are not repeated here.

In particular, the first value may be different from the second value. Various conversion strategies for the first value and the second value may be adopted. Certain exemplary conversion strategies for the first value and the second value are explained below, which is for illustrative purposes and is not intended to limit the scope of the present disclosure.

In one embodiment, the second value may be obtained by increasing or decreasing the first value by N, where N is a positive integer. For example, the second value may be obtained by increasing the first value by 1.

In another embodiment, the second value may be obtained by multiplying the first value by M, wherein M is a positive integer other than 1. When the first value is equal to 1, the first value may be first added by N and then multiplied by M.

In another embodiment, when the numbers in the first value are greater than or equal to 2 and the numbers in the first value are at least partially different, the second value may be obtained by exchange the order of numbers in the first value. For example, the first value is 12, then the second value may be 21. When the numbers in the first value are greater than 2, for example, the first value is 789, the second value may be obtained by exchange the order of any two numbers in the first value. For example, the second value may be 879, 987 and so on.

In another embodiment, the second value may be obtained by processing the first value according to a predetermined equation. The predetermined equation may include two or more calculation modes such as addition, subtraction, multiplication, division, logarithm calculation, and so on.

Further, after detecting that the terminal device establishes the connection with the storage device, the processor 22 may send the second device identifier to the storage device, such that the storage device relinks the second device identifier with the second communication identifier. That is, the terminal device may be able to release a linking relationship with the first communication identifier, and establish an association relationship (i.e., a linking relationship) with the second communication identifier.

Figure 3:
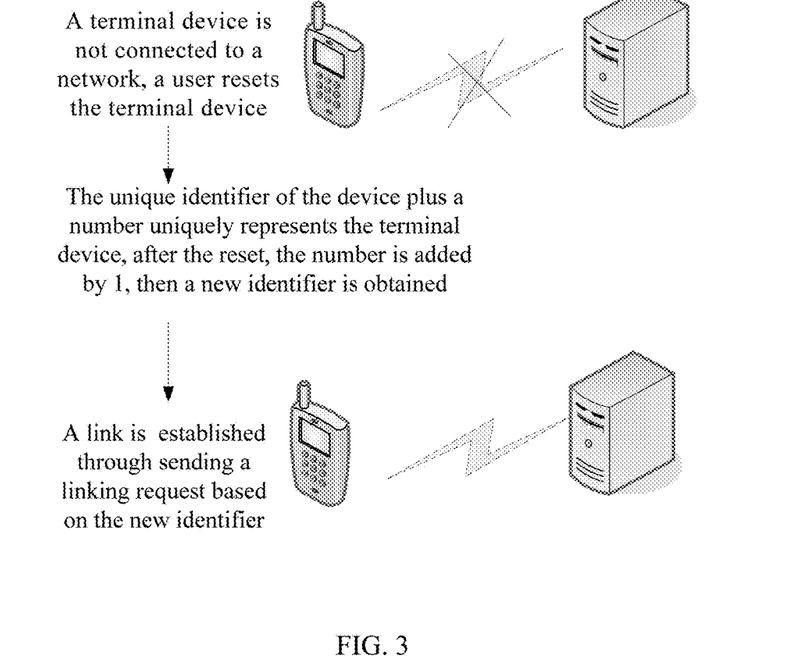
FIG. 3 illustrates an exemplary application scenario consistent with disclosed embodiments.

FIG. 3 illustrates an exemplary application scenario consistent with disclosed embodiments. As shown in FIG. 3, the unique identifier of the device (such as MAC address or serial number) plus a number (i.e., the unique identifier of the device+number) may be used to uniquely represent the terminal device. Provided that the terminal device is not connected to the network, after the user resets the terminal device, the number may be added by 1. Thus, once the user resets the terminal device, the unique identifier of the terminal device may be changed. The Cloud may take the reset terminal device as a new device, and a link may be established through sending a linking request based on the new identifier.

Accordingly, at the server side, the saved record of the association relationship, which is corresponding to the linking relationship between the stored device identifier and the user account, may also be periodically detected, and whether there are two records of the association relationship for the same device may also be determined.

After determining that there are two records of the association relationship for the same device, the server may automatically release (or delete) a record of the association relationship having the earliest created time, such that the server may only store one record of the association relationship for the same device. Thus, the server (or the storage device) may not save too much invalid data and the space usage efficiency may be ensured.

In the disclosed embodiments, provided that the storage device stores an association relationship between a first communication identifier and a first device identifier corresponding to the terminal device, and the terminal device is not connected to the storage device, a corresponding process may be performed, such that the storage device may be able to establish the association relationship between the second communication identifier and the terminal device. Thus, the problem that the association relationship between the terminal device and the communication identifier may be modified only after the connection between the terminal device and the storage device is established in the prior art may be resolved, and complicated issues that the original user needs to be unlinked in the prior art may be avoided.

The present disclosure also provides another terminal device. As shown in FIG. 2, the terminal device may comprise:

a monitor 21, wherein the monitor 21 monitors whether a predetermined condition is satisfied, provided that a storage device stores an association relationship between a first communication identifier and a first device identifier corresponding to a terminal device, and the terminal device is not connected to the storage device; and a processor 22, wherein the processor 22 performs a corresponding process after the monitor 21 monitors that the predetermined condition is satisfied, such that after the terminal device and the storage device are connected, the storage device stores an association relationship between a second communication identifier and a device identifier corresponding to the terminal device.

In the disclosed embodiments, the terminal device may include, for example, a smart phone, a tablet, a laptop, a smart speaker or a smart robot, and the storage device may include, for example, a storage-enabled server on the network.

The first communication identifier may be a user account for the user to operate the terminal device. In addition, the second communication identifier may be different from the first communication identifier, for example, the second communication identifier may be another user account.

When monitoring whether the predetermined condition is satisfied, the monitor 21 may detect whether the terminal device obtains an operation of clearing configuration information, wherein clearing the configuration information refers to deleting the data which is stored in the terminal device or the storage device and related to the configuration information of the terminal device.

The operation of clearing the configuration information may include a reset operation. Further, the configuration information to be cleared (i.e., the data related to configuration information to be cleared) may include information stored in the terminal device, or information stored in the storage device. After the original user transfers the terminal device to other users, other users may perform the process of clearing the original user's configuration. The original user's configuration may include data stored in the storage device on the network. After the reset operation is detected, it may be considered that the original linking relationship may be triggered to be released, and a new linking relationship may be triggered to be established.

Correspondingly, when performing the corresponding process, the processor 22 may set a first flag in a preset data area, wherein the preset data area is an area where no change occurs when the terminal device performs the operation of clearing the configuration information. The processor 22 may provide a third value to the first flag, such that after the connection between the terminal device and the storage device is established, the storage device may be able to release the association relationship between the first communication identifier and the device identifier of the terminal device.

In particular, during the reset of the terminal device, multiple data areas may exist, among which contents stored in one or more data areas may not change. In the disclosed embodiments, the one or more data areas whose content does not change during the reset of the terminal device may be determined as the preset data areas.

In the preset data area, a third value or a fourth value may be provided. For example, the third value may be "True" and the fourth value may be "False", or the third value may be 1 and the fourth value may be 0, or vice versa, as long as the terminal device is able to identify whether the original linking relationship is desired to be released.

After the first flag in the present data area is set as the third value, the terminal device may be instructed, after being reset, to at least send indication information to the storage device on the network. The indication information may be capable of releasing the association relationship between the first communication identifier and the device identifier of the terminal device, After the first flag in the present data area is set as the fourth value, the terminal device may be instructed, after being reset, to not send indication information. That is, the original linking relationship may not be released.

Further, after the terminal device and the storage device are connected and the first flag in the present data area is set as the third value, the processor 22 may send the indication information to the storage device. According to the indication information, the processor 22 may instruct the storage device to release the association relationship between the first communication identifier and the device identifier of the terminal device, such that the storage device may be able to associate the second communication identifier with the first device identifier.

Correspondingly, after the storage device receives the indication information, in the indication information, whether the first flag in the preset data area is set as the third value may be detected. In response to detecting that the first flag is set as the third value in the preset data area, the storage device may release the saved association relationship (linking relationship) between the first communication identifier and the device identifier of the terminal device.

Further, after the storage device releases the saved association relationship, the storage device may change the value of the first flag in the preset data area to the fourth value. That is, the third value may be changed to the fourth value.

In addition, after sending the indication information, the terminal device may also send the second communication identifier to the network given the new second identifier is desired to be linked, such that after receiving the second communication identifier, the storage device may link the second communication identifier to the device identifier of the terminal device.

Figure 4:
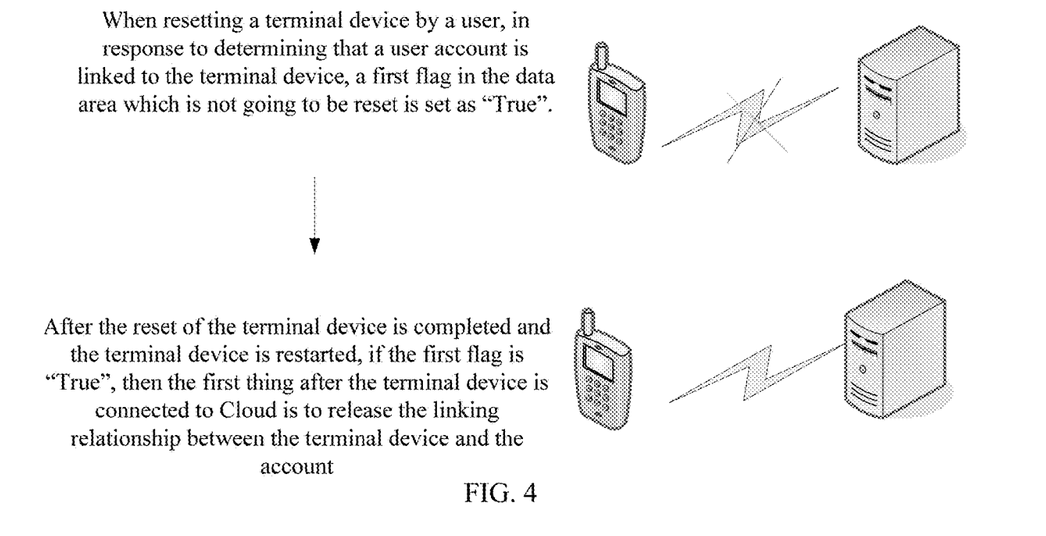
FIG. 4 illustrates another exemplary application scenario consistent with disclosed embodiments.

FIG. 4 illustrates another exemplary application scenario consistent with disclosed embodiments. As shown in FIG. 4, during the reset of the terminal device by the user, in response to determining that a user account is linked to the terminal device, a first flag in the data area which is not going to be reset may be set as "True". After the reset of the terminal device is completed and the terminal device is restarted, if the first flag is "True", then the first thing after the terminal device is connected to the Cloud is to release the linking relationship between the device and the account. After the releasing is completed, the first flag may be set to be "False". Thus, given a next account is going to be linked to the terminal device, the linking relationship between the device and the original account may have been released and, accordingly, the linking of the next account to the device may not be affected.

In the disclosed embodiments, provided that the storage device stores an association relationship between a first communication identifier and a first device identifier corresponding to the terminal device, and the terminal device is not connected to the storage device, a corresponding process may be performed, such that the storage device may be able to establish the association relationship between the second communication identifier and the terminal device. Thus, the problem that the association relationship between the terminal device and the communication identifier may be modified only after the connection between the terminal device and the storage device is established in the prior art may be resolved, and complicated issues that the original user needs to be unlinked in the prior art may be avoided.

The present disclosure further provides a storage medium. In the disclosed embodiments, the storage medium may execute programs of a processing method for media files.

In one embodiment, the storage medium may store various steps for performing the disclosed processing methods.

The present disclosure further provides a terminal device, which comprises a processor and a memory. The memory may store a computer program that is capable of running on the processor.

When executing the computer program, the processor may execute the steps of the disclosed processing methods.

In the disclosed embodiments, it should be understood that the disclosed system, apparatus, and method may be implemented in other manners. The described apparatus embodiment is merely for illustrative purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. The units described as separate parts may or may not be physically separate, and parts displayed as units may or may not be physical units, which may be located in one position, or may be distributed on a plurality of network units. A part or all of the units may be selected according to actual needs to achieve the objectives of the solutions in the embodiments.

Alternatively, functional units in the embodiments of the present disclosure may be integrated into one processor, or each of the units may exist alone physically, or two or more units are integrated into one unit. The integrated unit may be implemented in the form of hardware or may be implemented in the form of hardware combining a software functional unit.

Those skilled in the art should understand that, programs may instruct relevant hardware to execute all or a part of the steps of the processing method embodiments. The foregoing programs may be stored in a computer-readable storage medium. When the programs are executed, steps of the processing method described in the embodiments of the present disclosure may be executed. The storage medium includes: any medium that can store program code, such as a USB flash disk, a removable hard disk, a read-only memory (ROM), a random access memory (RAM), a magnetic disk, or an optical disc.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the disclosed embodiments, provided that the storage device stores an association relationship between a first communication identifier and a first device identifier corresponding to the terminal device, and the terminal device is not connected to the storage device, a corresponding process may be performed, such that the storage device may be able to establish the association relationship between the second communication identifier and the terminal device. Thus, the problem that the association relationship between the terminal device and the communication identifier may be modified only after the connection between the terminal device and the storage device is established in the prior art may be resolved, and complicated issues that the original user needs to be unlinked in the prior art may be avoided. Accordingly, the efficiency of operating the terminal device may be improved, and the user experience may be enhanced.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A processing method, comprising:
   monitoring whether a terminal device that has a first device identifier performed a clearing operation of deleting data related to configuration information of the terminal device while not connected to a storage device that stores an association relationship between a first communication identifier and the first device identifier, the first device identifier being generated by combining a unique device identifier corresponding to the terminal device and a first value; and
   in response to determining that the terminal device performed the clearing operation:
      processing the first value to generate a second value that is different from the first value;
      changing a device identifier of the terminal device from the first device identifier to a second device identifier, the second device identifier being generated by combining the unique device identifier and the second value; and
      sending, after a connection between the terminal device and the storage device is established, the second device identifier to the storage device to cause the storage device to:
         store an association relationship between a second communication identifier and the second device identifier; and
         release the association relationship between the first communication identifier and the first device identifier.

2. The processing method according to claim 1, wherein the unique device identifier uniquely identifies the terminal device at different times.

3. The processing method according to claim 1, wherein the data related to the configuration information of the terminal device is stored in the terminal device or the storage device.

4. The processing method according to claim 1, further comprising:
   setting a flag in a preset data area, wherein the preset data area is an area where changes do not occur during the clearing operation performed by the terminal device; and
   setting the flag as a third value, the third value indicating that the terminal device requests the storage device to release the association relationship between the first communication identifier and the first device identifier of the terminal device.

5. The processing method according to claim 4, further comprising:
   after the connection between the terminal device and the storage device is established and the flag is set as the third value, sending indication information to the storage device to cause the storage device to release the association relationship between the first communication identifier and the first device identifier, and to associate the second communication identifier with the second device identifier.

6. The processing method according to claim 5, further comprising:
   changing the flag from the third value to a fourth value after the association relationship between the first communication identifier and the first device identifier is released.

7. The processing method according to claim 5, wherein:
   the third value is one of true and false, and the fourth value is another one of true and false; or
   the third value is one of 1 and 0, and the fourth value is another one of 1 and 0.

8. The processing method according to claim 1, wherein the unique device identifier includes an MAC address or a serial number of the terminal device.

9. The processing method according to claim 1, further comprising:
   generating the second device identifier by combining the unique device identifier and the second value, including:
      generating the second device identifier by arranging the second value after the unique device identifier;
      generating the second device identifier by arranging the second value before the unique device identifier; or
      generating the second device identifier by processing the second value and the unique device identifier based on a calculation mode.

10. The processing method according to claim 1, wherein:
    the first communication identifier is a first user account; and
    the second communication identifier is a second user account different from the first user account.

11. The processing method according to claim 1, wherein processing the first value to generate the second value includes:
    increasing or decreasing the first value by N to generate the second value, N being a positive integer;
    multiplying the first value by M to generate the second value, M being a positive integer other than 1; or
    changing sequences of two or more numbers in a plurality of numbers in the first value to obtain the second value.

12. A terminal device, comprising:
    a memory storing a computer program; and a processor configured to execute the computer program to perform a processing method including:
  monitoring whether the terminal device that has a first device identifier performed a clearing operation of deleting data related to configuration information of the terminal device while not connected to a storage device that stores an association relationship between a first communication identifier and the first device identifier, the first device identifier being generated by combining a unique device identifier corresponding to the terminal device and a first value; and
  in response to determining that the terminal device performed the clearing operation:
    processing the first value to generate a second value that is different from the first value;
    changing a device identifier of the terminal device from the first device identifier to a second device identifier, the second device identifier being generated by combining the unique device identifier and the second value; and
    sending, after a connection between the terminal device and the storage device is established, the second device identifier to the storage device to cause the storage device to:
      store an association relationship between a second communication identifier and the second device identifier; and
      release the association relationship between the first communication identifier and the first device identifier.

13. The terminal device according to claim 12, wherein the unique device identifier uniquely identifies the terminal device at different times.

14. The terminal device according to claim 12, wherein the data related to the configuration information of the terminal device is stored in the terminal device or the storage device.

15. The terminal device according to claim 12, wherein the processor:
  sets a flag in a preset data area, wherein the preset data area is an area where changes do not occur during the clearing operation performed by the terminal device; and
  sets the flag as a third value, the third value indicating that the terminal device requests the storage device to release the association relationship between the first communication identifier and the first device identifier of the terminal device.

16. The terminal device according to claim 15, wherein the processor:
  sends indication information to the storage device after the connection between the terminal device and the storage device is established and the flag is set as the third value to cause the storage device to release the association relationship between the first communication identifier and the first device identifier of the terminal device, and to associate the second communication identifier with the second device identifier.

* * * * *